US011544971B2

(12) United States Patent
Sato (10) Patent No.: US 11,544,971 B2
(45) Date of Patent: Jan. 3, 2023

(54) INFORMATION PROCESSING DEVICE, TERMINAL DEVICE

(71) Applicant: PIONEER CORPORATION, Tokyo (JP)

(72) Inventor: Yoshifumi Sato, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 411 days.

(21) Appl. No.: 16/346,344

(22) PCT Filed: Oct. 6, 2017

(86) PCT No.: PCT/JP2017/036486
§ 371 (c)(1),
(2) Date: Apr. 30, 2019

(87) PCT Pub. No.: WO2018/079235
PCT Pub. Date: May 3, 2018

(65) Prior Publication Data
US 2019/0266810 A1  Aug. 29, 2019

(30) Foreign Application Priority Data

Oct. 31, 2016  (JP) .............................. JP2016-213604

(51) Int. Cl.
*G01S 19/42* (2010.01)
*G08G 1/16* (2006.01)
(Continued)

(52) U.S. Cl.
CPC .............. *G07C 5/008* (2013.01); *B60R 21/00* (2013.01); *G07C 5/0816* (2013.01);
(Continued)

(58) Field of Classification Search
None
See application file for complete search history.

(56) References Cited

U.S. PATENT DOCUMENTS 9,457,754 B1* 10/2016 Christensen ........... B60Q 1/525
10,121,148 B1* 11/2018 Kozlowski .............. H04W 4/44
(Continued)

FOREIGN PATENT DOCUMENTS

JP 2001-266294 A 9/2001
JP 2002-185647 A 6/2002
(Continued)

OTHER PUBLICATIONS

International Search Report and Written Opinion for related International Application No. PCT/JP2017/036486, dated Dec. 26, 2017, English translation of ISR provided; 10 pages.
(Continued)

*Primary Examiner* — Adam D Tissot
*Assistant Examiner* — Laura E Linhardt
(74) *Attorney, Agent, or Firm* — Procopio, Cory, Hargreaves & Savitch LLP (57) ABSTRACT

An information processing device comprises an accident notification accepting unit, a withdrawal notification accepting unit and an area identifying unit. The accident notification accepting unit accepts from a mobile object an accident notification containing accident determination information indicating that it is determined that an accident has occurred in said mobile object and occurrence site information indicating the site where it is determined that the accident has occurred.
The withdrawal notification accepting unit accepts a withdrawal notification to withdraw said accident notification. The area identifying unit records the occurrence site information contained in the accident notification withdrawn by said withdrawal notification and identifies a withdrawal-notification prone area based on the recorded occurrence site information.

15 Claims, 8 Drawing Sheets

(51) Int. Cl.
| | |
|---|---|
| *G06Q 40/08* | (2012.01) |
| *B60R 21/00* | (2006.01) |
| *B60R 21/0136* | (2006.01) |
| *B60W 40/08* | (2012.01) |
| *G07C 5/00* | (2006.01) |
| *H04W 4/40* | (2018.01) |
| *G07C 5/08* | (2006.01) |
| *G08G 1/00* | (2006.01) |

(52) U.S. Cl.
CPC ............ *G07C 5/0841* (2013.01); *G08G 1/00* (2013.01); *G08G 1/205* (2013.01); *H04W 4/40* (2018.02)

(56) References Cited

U.S. PATENT DOCUMENTS

| | | | | |
|---|---|---|---|---|
| 10,417,914 B1* | 9/2019 | Vose | ...................... | G08G 1/123 |
| 2007/0005609 A1* | 1/2007 | Breed | .................. | G01S 5/0072 |
| 2011/0040481 A1 | 2/2011 | Trombley et al. | | |
| 2014/0108058 A1* | 4/2014 | Bourne | .................. | G06Q 40/08 |
| | | | | 705/4 |
| 2016/0094964 A1 | 3/2016 | Barfield et al. | | |
| 2016/0362075 A1* | 12/2016 | Dlagnekov | ......... | G01P 15/0891 |

FOREIGN PATENT DOCUMENTS

| | | |
|---|---|---|
| JP | 2007-112435 A | 5/2007 |
| JP | 2014-137682 A | 7/2014 |
| JP | 2016-004478 A | 1/2016 |
| JP | 2016-091165 A | 5/2016 |
| WO | 2015/164034 A1 | 10/2015 |

OTHER PUBLICATIONS

Office Action dated Aug. 31, 2021 from counterpart Japanese Patent Application No. 2020-103201, 6 pages.

Office Action received in European Patent Application No. 17 866 218.5, dated Oct. 27, 2022, in 7 pages.

* cited by examiner

FIG.8

INFORMATION PROCESSING DEVICE, TERMINAL DEVICE

CROSS-REFERENCE TO RELATED APPLICATIONS

This application is a U.S. National Stage entry of PCT Application No: PCT/JP2017/036486 filed Oct. 6, 2017, which claims priority to Japanese Patent Application No. 2016-213604, filed Oct. 31, 2016, the contents of which are incorporated herein by reference.

TECHNICAL FIELD

The present invention relates to an information processing device and a terminal device.

TECHNICAL BACKGROUND

There has been proposed an accident notifying system that, if an accident occurs in a mobile object such as a vehicle, automatically notifies the occurrence of the accident to a server. In this accident notifying system, for example, a terminal device mounted in a vehicle detects impact occurring in the vehicle and determines based on the detected magnitude of the impact (impact value) whether an accident has occurred. And if determining that an accident has occurred, the terminal device notifies the fact of accident occurrence and the site of occurrence of the accident to an external server via radio communication (e.g., Patent Document 1).

PRIOR ARTS LIST

Patent Document

Patent Document 1: Japanese Laid-Open Patent Publication No. 2001-266294

SUMMARY OF THE INVENTION

Problems to be Solved by the Invention

In the above conventional technique, when impact above or at a certain level is detected, it is uniformly determined that an accident has occurred and is notified, and thus a so-called false notification reporting an accident, occurs in spite of no accident having actually occurred. For example, false notifications tend to increase on roads on which impact is likely to occur because of irregularities in the surface, the condition of a curve and inclination, and the like. In contrast, if the reference value (threshold) for impact values with which to determine as an accident is raised so that no false notification occurs, then there is the problem that accidents with weak impact cannot be notified as accidents.

The problem that false notifications may occur in a large number with the accident notifying system that notifies the occurrence of an accident can be cited as an example of problems to be solved by the present invention.

Means to Solve the Problems

The invention according to an exemplary aspect is an information processing device comprising: an accident notification accepting unit that accepts from a mobile object an accident notification containing accident determination information indicating that it is determined that an accident has occurred in said mobile object and occurrence site information indicating the site where it is determined that the accident has occurred; a withdrawal notification accepting unit that accepts a withdrawal notification to withdraw said accident notification; and an area identifying unit that records the occurrence site information contained in the accident notification withdrawn by said withdrawal notification and identifies a withdrawal-notification prone area based on the recorded occurrence site information.

The invention according to an exemplary aspect is a terminal device to be mounted in a mobile object characterized by comprising: an accident determining unit that determines that an accident has occurred in said mobile object; a transmitting unit that transmits an accident notification containing information about the site where it is determined that the accident has occurred, according to determination of said accident determining unit; and a receiving unit that receives information about a withdrawal-notification prone area where withdrawal of said accident notification often happens.

The invention according to an exemplary aspect is an information processing method executed by an information processing device having a notification accepting means and an area identifying means, the information processing method comprising: a step of accepting from a mobile object an accident notification containing accident determination information indicating that it is determined that an accident has occurred in said mobile object and occurrence site information indicating the site where it is determined that the accident has occurred; a step of accepting a withdrawal notification to withdraw said accident notification; and a step of recording the occurrence site information contained in the accident notification withdrawn by said withdrawal notification and identifying a withdrawal-notification prone area based on the recorded occurrence site information.

The invention according to an exemplary aspect is an accident reporting method executed by a terminal device being mounted in a mobile object and having an accident determining means, a transmitting means and a receiving means, the accident reporting method comprising: a step of determining that an accident has occurred in said mobile object; a step of transmitting an accident notification containing information about the site where it is determined that the accident has occurred, according to determination of occurrence of the accident; and a step of receiving information about a withdrawal-notification prone area where withdrawal of said accident notification often happens.

The invention according to an exemplary aspect is a program configured to cause a computer executing; a step of accepting from a mobile object an accident notification containing accident determination information indicating that it is determined that an accident has occurred in said mobile object and occurrence site information indicating the site where it is determined that the accident has occurred; a step of accepting a withdrawal notification to withdraw said accident notification; and a step of recording the occurrence site information contained in the accident notification withdrawn by said withdrawal notification and identifying a withdrawal-notification prone area based on the recorded occurrence site information.

The invention according to an exemplary aspect is characterized by A program configured to cause a computer executing; a step of determining that an accident has occurred in a mobile object; a step of transmitting an accident notification containing information about the site where it is determined that the accident has occurred, according to determination of occurrence of the accident;

and a step of receiving information about a withdrawal-notification prone area where withdrawal of said accident notification often happens.

DESCRIPTION OF THE EMBODIMENTS

Embodiments of the present invention will be described below with reference to the drawings. The same reference numerals are used to denote substantially the same or equivalent parts in the descriptions and accompanying drawings of the embodiments below.

Embodiment 1

Figure 1:
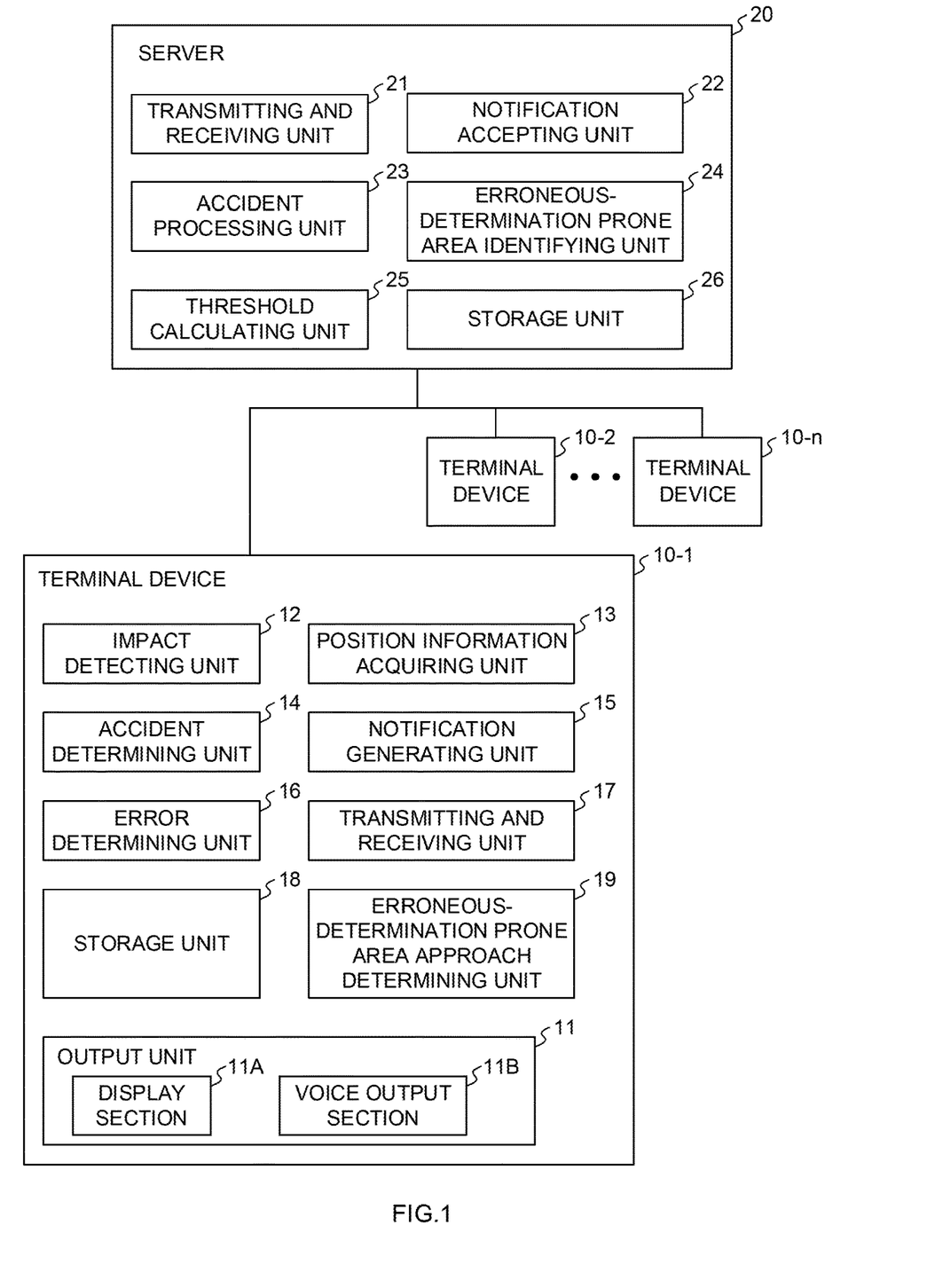
FIG. 1 is a block diagram showing the configurations of a terminal device and a server.

FIG. 1 is a block diagram showing the configuration of an accident notifying system according to Embodiment 1. The accident notifying system is composed of a server 20 and a plurality of terminal devices 10-1 to 10-n (n is an integer of two or greater). [0015] The terminal device 10-1 to 10-n is, for example, a navigation device mounted in a mobile object such as a vehicle (hereinafter simply called a vehicle) and performs radio communication with the server 20. The terminal devices 10-1 to 10-n each have the same configuration, and hence the configuration of the terminal device 10-1 will be described below with description of the configurations of the terminal devices 10-2 to 10-n being omitted.

The terminal device 10-1 has an output unit 11, an impact detecting unit 12, a position information acquiring unit 13, an accident determining unit 14, a notification generating unit 15, an error determining unit 16, a transmitting and receiving unit 17, a storage unit 18, and an erroneous-determination prone area approach determining unit 19.

The output unit 11 is composed of a display section 11A and a voice output section 11B. The display section 11A is constituted by a display panel such as a liquid crystal display and has a function to display, e.g., buttons of a touch-panel type. The voice output section 11B is constituted by a voice output device such as a speaker.

The impact detecting unit 12 is constituted by, e.g., an acceleration sensor and detects the magnitude of impact occurring in the vehicle as an impact value G (hereinafter simply called an impact value) based on a change in acceleration of the vehicle.

The position information acquiring unit 13 is constituted by, e.g., a GPS (Global Positioning System) sensor and acquires position information indicating the current position of the vehicle. For example, the position information acquiring unit 13 receives radio waves transmitted from a plurality of GPS satellites and calculates the distance from each GPS satellite based on the received radio waves to acquire position information.

The accident determining unit 14 determines that an accident has occurred when the impact value detected by the impact detecting unit 12 is greater than or equal to a threshold.

The notification generating unit 15 generates an accident notification containing information about the impact value of detected impact and the traveling speed and position of the vehicle when the impact was detected according to accident determination by the accident determining unit 14. Further, the notification generating unit 15 generates a withdrawal notification to withdraw the accident notification if the error determining unit 16 determines that the accident determination is false.

The error determining unit 16 determines whether accident determination by the accident determining unit 14 is false. For example, after the impact detecting unit 12 detects impact greater than or equal to the threshold, the error determining unit 16 determines whether the vehicle travels normally based on whether the vehicle travels a predetermined distance in a predetermined time and, when determining that the vehicle travels normally, determines that the accident determination is false.

Further, during a predetermined withdrawal acceptance time, the error determining unit 16 makes the display section 11A of the output unit 11 display a withdrawal button of a touch-panel type to accept the withdrawal of accident notification by the driver's judgement. If the withdrawal button is operated, the error determining unit 16 determines that the accident determination is false.

The transmitting and receiving unit 17 transmits the accident notification generated by the notification generating unit 15 to the server 20. Further, after transmitting the accident notification to the server 20, the transmitting and receiving unit 17 transmits a withdrawal notification to the server 20 if the error determining unit determines that the accident determination is false.

Further, the transmitting and receiving unit 17 receives information about the threshold of impact used in accident determination by the accident determining unit 14 and information about an erroneous-determination prone area from the server 20.

The storage unit 18 stores a variety of information including information about the threshold of impact and the erroneous-determination prone area received by the transmitting and receiving unit 17.

The erroneous-determination prone area approach determining unit 19 determines whether the vehicle is approaching the erroneous-determination prone area (that is, whether the vehicle will enter the erroneous-determination prone area within a predetermined reference time) based on information about the erroneous-determination prone area stored in the storage unit 18 and position information acquired by the position information acquiring unit 13. Then the erroneous-determination prone area approach determining unit 19 makes the output unit 11 output the determining result.

Specifically, when determining that the vehicle is approaching the erroneous-determination prone area, the erroneous-determination prone area approach determining unit 19 makes, for example, a message to notify approaching the erroneous-determination prone area and to prompt the driver to notice ("An erroneous-determination prone area . . . meters ahead, please carefully travel." or the like) be displayed on the screen of the display section 11A. Further, the erroneous-determination prone area approach determining unit 19 makes the voice output section 11B output a voice message corresponding to the message displayed by the display section 11A.

The server 20 includes a transmitting and receiving unit 21, a notification accepting unit 22, an accident processing unit 23, an erroneous-determination prone area identifying unit 24, a threshold calculating unit 25, and a storage unit 26.

The transmitting and receiving unit 21 transmits and receives information data to and from the terminal devices 10-1 to 10-$n$ and receives accident notifications and withdrawal notifications. Further, the transmitting and receiving unit 21 transmits information about the threshold of impact to be used in accident determination by the terminal devices 10-1 to 10-$n$ and the erroneous-determination prone area to the terminal devices 10-1 to 10-$n$.

The notification accepting unit 22 accepts accident notifications and withdrawal notifications from the terminal devices 10-1 to 10-$n$ via the transmitting and receiving unit 21. The notification accepting unit 22 acquires information about the detection position of impact and speed of the vehicle, and information about the impact value contained in an accident notification to store in the storage unit 26.

If the notification accepting unit 22 accepts an accident notification and does not accept a withdrawal notification within a predetermined withdrawal time, then the accident processing unit 23 performs a process of establishing voice communication between the operator terminal (not shown) used by the operator and the terminal device which transmitted the accident notification, and a process of notifying accident occurrence with position information to a police station and a fire station (hereinafter collectively called an accident process). In the voice communication between the operator terminal and the terminal device, for example, questioning by the operator, the driver's response thereto, and the like are performed.

The erroneous-determination prone area identifying unit 24 identifies an area including many detection positions for which an accident notification was withdrawn as an erroneous-determination prone area based on information about the detection positions of impact contained in accident notifications (withdrawn accident notifications and not-withdrawn accident notifications) accepted by the notification accepting unit 22. For example, the erroneous-determination prone area identifying unit 24, for each area of a certain size (e.g., an area 50 meters square), calculates the proportion of the number of accident notifications withdrawn by withdrawal notifications to the number of accepted accident notifications as a withdrawal rate and identifies an area of a high withdrawal rate as an erroneous-determination prone area. Note that the erroneous-determination prone area identifying unit 24 does not calculate a withdrawal rate for an area where the number of accepted accident notifications is less than a predetermined reference value (that is, an area where the number of samples, accident notifications, is small) and does not identify the area as an erroneous-determination prone area.

The threshold calculating unit 25 calculates a reference value for impact values based on accident notifications and withdrawal notifications accepted by the notification accepting unit 22 and sets thresholds for impact that the terminal devices 10-1 to 10-$n$ use in accident determination.

Figure 2A:
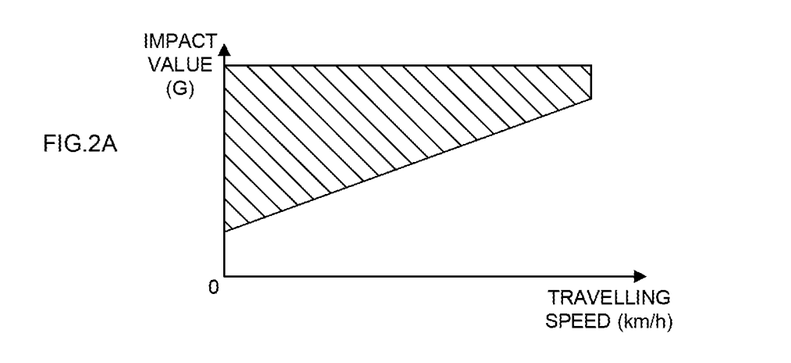
FIGS. 2A, 2B and 2C are diagrams showing schematically the relation between the impact value, vehicle speed, and impact threshold.
Figure 2B:
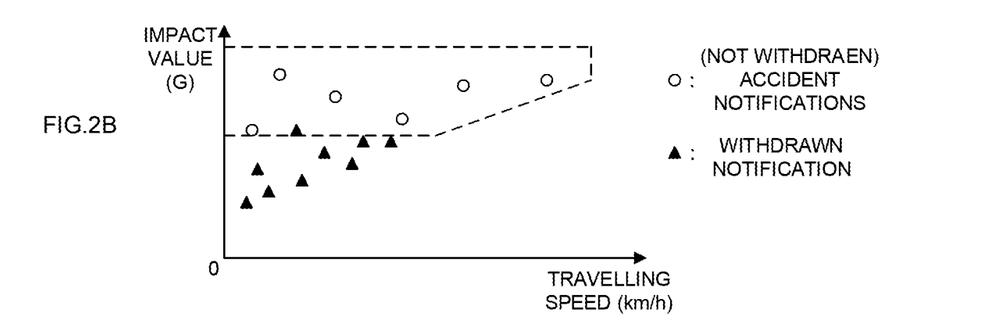
Figure 2C:
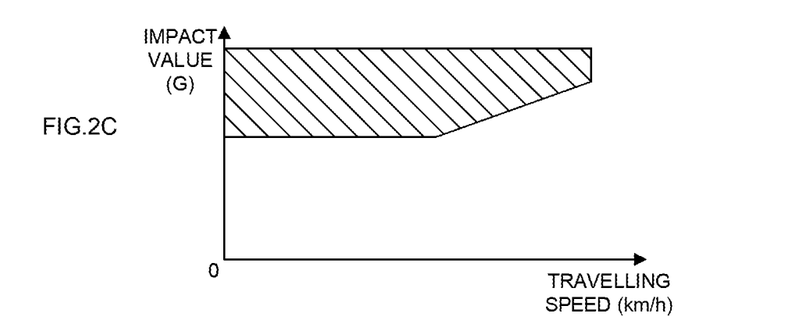

FIGS. 2A, 2B and 2C are diagrams schematically showing the relation between the traveling speed, impact value, and threshold. The hatched portions of the figures indicate ranges above or at a threshold (that is, ranges where it is determined that an accident occurs. In general, as the traveling speed of a vehicle becomes greater, impact occurring in the vehicle becomes greater, and hence the threshold of impact used in accident determination is determined according to the traveling speed in principle as shown in FIG. 2A. The threshold calculating unit 25 makes a change to this by a statistical technique so as to set a threshold of impact suitable for the area (that is, a threshold applied to each area).

If a predetermined number or greater of accident notifications are accepted by the notification accepting unit 22 and stored in the storage unit 26, the threshold calculating unit 25 calculates an impact value as a reference based on impact values and traveling speeds contained in accident notifications to set a threshold for impact. For example, the threshold calculating unit 25 calculates a standard deviation for how impact values are distributed in a certain speed range to set a threshold for impact.

FIG. 2B is a diagram showing an example of how accident notifications (not-withdrawn accident notifications and withdrawn accident notifications) are distributed against the impact value and the traveling speed. The threshold calculating unit 25 sets a threshold for impact based on this distribution such that the smallest impact value (corresponding to the traveling speed) from among impact values contained in the not-withdrawn accident notifications is included in a region above or at the threshold (that is, a region where it is determined that an accident occurs) as shown in FIG. 2C.

The storage unit 26 accumulates and stores accident notifications and withdrawal notifications accepted by the notification accepting unit 22, thresholds for impact set by the threshold calculating unit 25, and information about erroneous-determination prone areas identified by the erroneous-determination prone area identifying unit 24.

Figure 3:
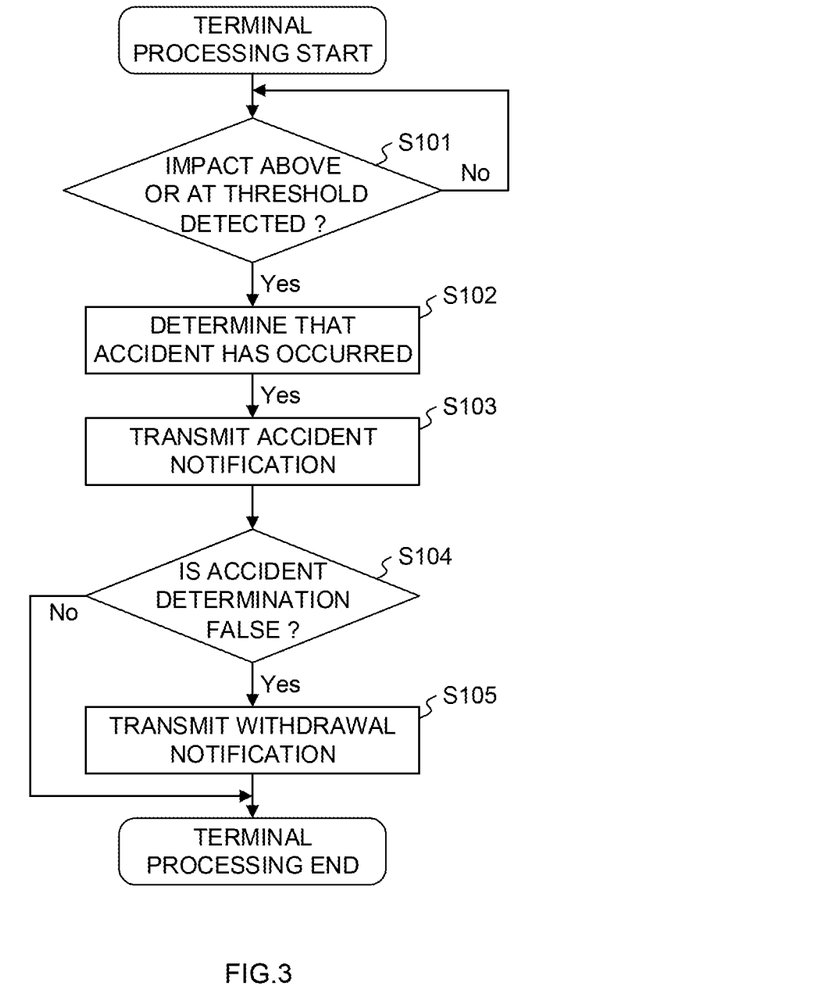
FIG. 3 is a flow chart showing the processing operation of a terminal device.
Figure 4:
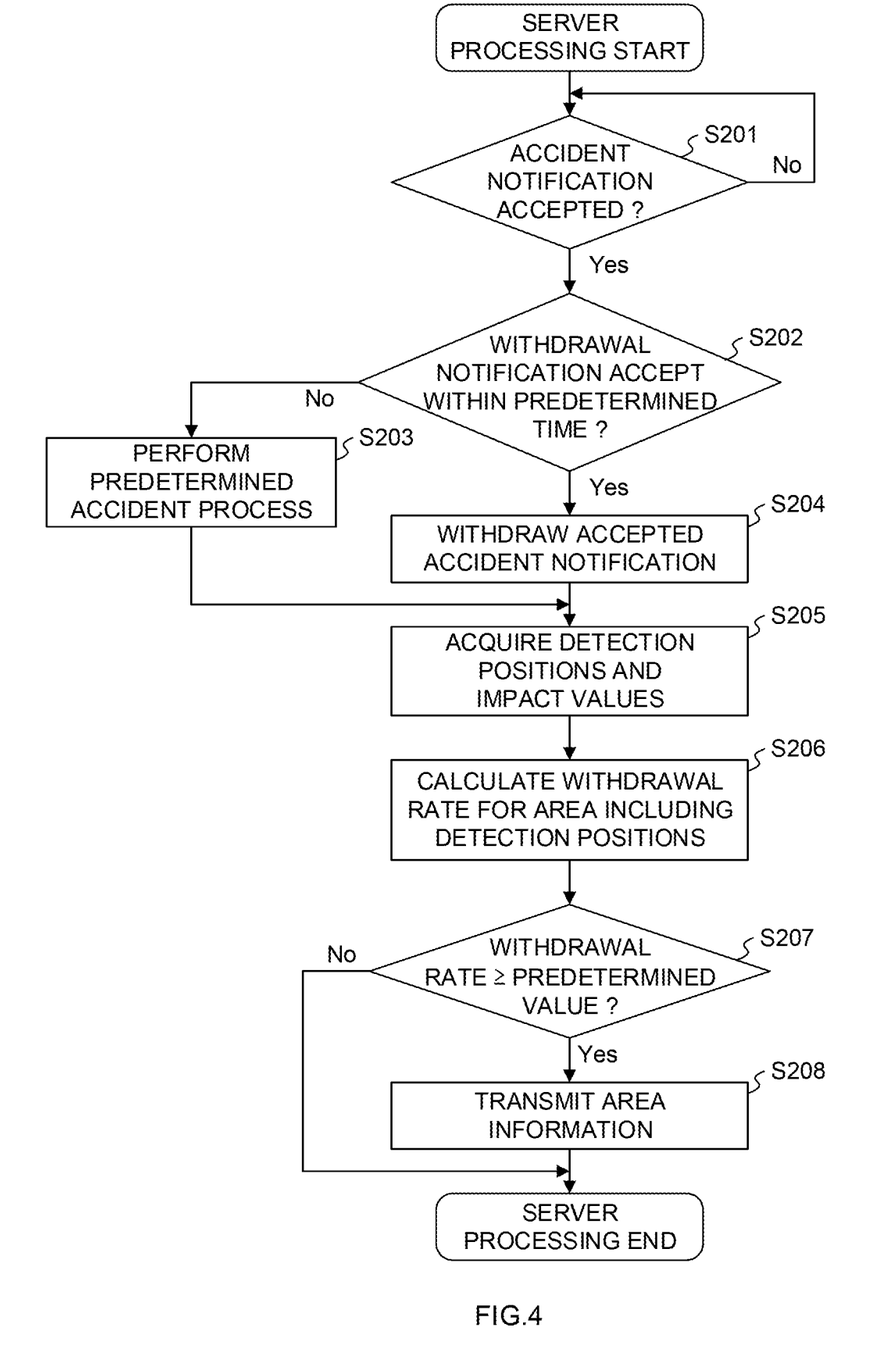
FIG. 4 is a flow chart showing the processing operation of a server.
Figure 5:
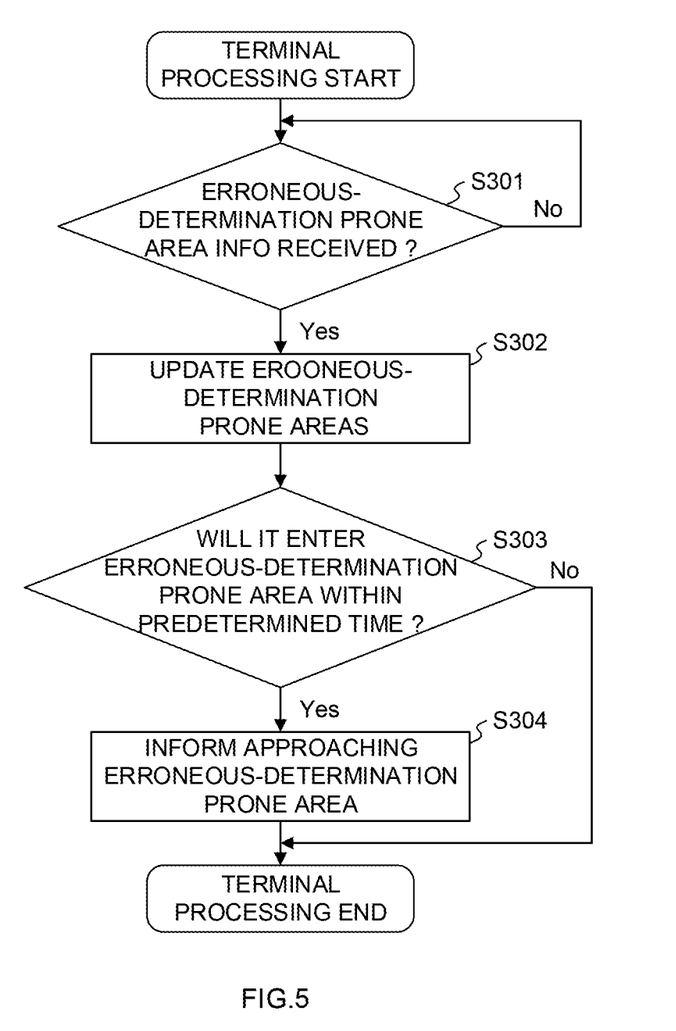
FIG. 5 is a flow chart showing the processing operation of the terminal device.

Next, the operation of accident notification processing executed by the server 20 and the terminal devices 10-1 to 10-$n$ will be described with reference to the flow charts of FIGS. 3 to 5. Note that description of the threshold calculation processing executed by the threshold calculating unit 25 of the server 20 is omitted.

First, a first processing operation executed by the terminal devices 10-1 to 10-$n$ will be described with reference to the flow chart of FIG. 3. In the description below, one of the terminal devices 10-1 to 10-$n$ is also called simply the terminal device 10.

The impact detecting unit 12 of the terminal device 10 determines whether impact greater than or equal to the threshold has been detected (step S101). If impact greater than or equal to the threshold has been detected, the accident determining unit 14 determines that an accident has occurred (step S102).

The notification generating unit 15 generates an accident notification containing position information indicating the position of the vehicle when impact was detected and information about the speed of the vehicle and the impact value of detected impact. The transmitting and receiving unit 17 transmits the accident notification generated by the notification generating unit 15 to the server 20 (step S103).

The error determining unit 16 determines whether the accident determination is false (step S104). Specifically, the error determining unit 16 determines that the accident determination is false if the vehicle has traveled a predetermined distance within a predetermined time or if the driver has operated the withdrawal button. On the other hand, if the vehicle has not traveled a predetermined distance and has stopped, and the withdrawal button has not been operated, then it is determined that the accident determination is not false.

If it is determined that the accident determination is not false, the terminal device 10 finishes the process. On the other hand, if it is determined that the accident determination is false, the notification generating unit 15 of the terminal device 10 generates a withdrawal notification to withdraw the accident notification. The transmitting and receiving unit 17 transmits the withdrawal notification to the server 20 (step S105).

Next, the processing operation of the server 20 will be described with reference to the flow chart of FIG. 4.

The notification accepting unit 22 determines whether an accident notification has been accepted (that is, whether the transmitting and receiving unit 21 has received an accident notification) (step S201). If determining that an accident notification has been accepted, the notification accepting unit determines whether a withdrawal notification has been accepted (that is, whether the transmitting and receiving unit 21 has received a withdrawal notification) within a predetermined time (step S202).

If determining that a withdrawal notification has not been accepted within the predetermined time, the notification accepting unit 22 supplies accident-notification acceptance information indicating that the accident notification has been accepted to the accident processing unit 23. The accident processing unit 23 performs a predetermined accident process (step S203).

In contrast, if determining that a withdrawal notification has been accepted within the predetermined time, the notification accepting unit 22 withdraws the accepted accident notification (step S204).

The notification accepting unit 22 acquires information about the detection positions of impact, information about vehicle speeds, and information about impact values contained in accident notifications (that is, withdrawn accident notifications and not-withdrawn accident notifications) (step S205) and stores in the storage unit 26.

The erroneous-determination prone area identifying unit 24 calculates the withdrawal rate of accident notifications in a predetermined range of area (e.g., an area 50 meters square) including detection positions based on information about the detection positions, vehicle speeds, and impact values of past accident notifications stored in the storage unit 26 (step S206).

The erroneous-determination prone area identifying unit 24 determines whether the calculated withdrawal rate is greater than or equal to a predetermined value (step S207). If the withdrawal rate is not greater than or equal to the predetermined value, the server 20 finishes the process. On the other hand, if determining that the withdrawal rate is greater than or equal to the predetermined value, the erroneous-determination prone area identifying unit 24 updates information about erroneous-determination prone areas stored in the storage unit 26. The transmitting and receiving unit 21 transmits the updated information about erroneous-determination prone areas to the terminal devices 10-1 to 10-$n$ (step S208).

Apart from the process of steps S207 and S208, if the withdrawal rate in an area that has been an erroneous-determination prone area until now lowers to less than the predetermined value, the erroneous-determination prone area identifying unit 24 excludes that area from the erroneous-determination prone areas and updates information about the erroneous-determination prone areas stored in the storage unit 26. The transmitting and receiving unit 21 transmits the updated information about the erroneous-determination prone areas to the terminal devices 10-1 to 10-$n$.

Next, a second processing operation executed by the terminal devices 10-1 to 10-$n$ will be described with reference to the flow chart of FIG. 5.

The transmitting and receiving unit 17 determines whether information about the erroneous-determination prone areas has been received from the server 20 (step S301). When determining that information about the erroneous-determination prone areas has been received, the unit 17 updates information about erroneous-determination prone areas stored in the storage unit 18 (step S302).

The erroneous-determination prone area approach determining unit 19 determines whether the vehicle will enter an erroneous-determination prone area within a predetermined reference time based on information about the erroneous-determination prone areas and current-position information acquired by the position information acquiring unit 13 (step S303).

If determining that the vehicle will not enter an erroneous-determination prone area within the predetermined reference time, the terminal device 10 finishes the process. On the other hand, if it is determined that the vehicle will pass through an erroneous-determination prone area within the predetermined reference time, the output unit 11 informs that the vehicle is approaching an erroneous-determination prone area (step S304). For example, the display section 11A displays a message indicating that the vehicle is approaching an erroneous-determination prone area and to call the driver's attention, and the voice output section 11B outputs a voice message corresponding to this.

As described above, in the accident notifying system of the present embodiment, a terminal device that has detected impact greater than or equal to the threshold transmits an accident notification to the server. Thereafter, the terminal device determines whether the accident determination is false, and, if determining being false, transmits a withdrawal notification to the server. The server updates information about erroneous-determination prone areas that designates areas where the withdrawal of an accident notification often happens based on received accident notifications and withdrawal notifications and transmits the updated information about erroneous-determination prone areas to the terminal devices.

In the accident notifying system of the present embodiment, the server can identify areas where the withdrawal of an accident notification often happens (that is, erroneous-determination prone areas) based on accident notifications and withdrawal notifications transmitted from the terminal devices. Thus, when an accident notification is made, the accident process can be appropriately performed based on information about erroneous-determination prone areas.

Further, the server calculates an impact value as a reference based on information about impact detection positions, vehicle speeds, and impact values, and the like contained in accident notifications (that is, withdrawn accident notifications and not-withdrawn accident notifications) and sets a threshold for impact to be used by the terminal device in accident determination. Thus, the threshold as a reference with which to determine an accident occurring can be changed according to the shape of the road, vehicle speed, and so on, so that erroneous determination of an accident can be prevented.

The terminal device receives information about erroneous-determination prone areas from the server. Thus, the driver who drives a vehicle having the terminal device mounted therein can drive avoiding large impact by lowering the speed or so on when passing through that area, based on information about erroneous-determination prone areas, so that erroneous determination of an accident can be prevented.

Embodiment 2

An accident notifying system of the present embodiment has substantially the same configuration as the accident notifying system of Embodiment 1 shown in FIG. 1 and is different in the operation of the notification generating unit and transmitting and receiving unit 17 of the terminal devices 10-1 to 10-n and the operation of the transmitting and receiving unit 21 and notification accepting unit 22 of the server 20 from the accident notifying system of Embodiment 1.

The notification generating unit 15 generates an accident notification containing information about the impact value of detected impact and the traveling speed and position of the vehicle when the impact was detected in response to accident determination by the accident determining unit 14. Further, the notification generating unit 15 generates an erroneous-determination notification indicating that an erroneous-determination was made if the error determining unit determines that the accident determination is false. The erroneous-determination notification includes position information of the site where impact was detected, information about the speed of the vehicle, information about the impact value, and information indicating that the impact was not what was caused by an accident.

If the notification generating unit 15 has generated an accident notification, and the error determining unit has not determined that the accident determination is false within a predetermined time (e.g., 20 sec) (that is, if the accident determination has not been withdrawn), then the transmitting and receiving unit 17 transmits an accident notification to the server 20.

On the other hand, if, after the accident determining unit 14 determines that an accident has occurred, the error determining unit 16 determines that the accident determination is false within the predetermined time, then instead of an accident notification an erroneous-determination notification is transmitted to the server 20. That is, in the accident notifying system of the present embodiment, if the error determining unit determines that the accident determination is false, an accident notification is not transmitted to the server 20, and only an erroneous-determination notification is transmitted to the server 20.

The transmitting and receiving unit 21 of the server transmits and receives information data to and from the terminal devices 10-1 to 10-n and receives accident notifications and erroneous-determination notifications. Note that the terminal devices 10-1 to 10-n selectively transmit an accident notification or erroneous-determination notification according to the determination of the error determining unit 16, so that the transmitting and receiving unit 21 of the server 20 receives one of an accident notification and erroneous-determination notification.

The notification accepting unit 22 accepts one of an accident notification and erroneous-determination notification from the terminal device 10-1 to 10-n via the transmitting and receiving unit 21. The notification accepting unit 22 acquires information about the detection position of impact and the speed of the vehicle, and information about the impact value contained in the accident notification or erroneous-determination notification and stores in the storage unit 26.

The erroneous-determination prone area identifying unit 24 counts the number of erroneous determinations for each area of a certain size (e.g., an area 50 meters square) based on information about the detection positions of impact contained in erroneous-determination notifications stored in the storage unit 26. Then the erroneous-determination prone area identifying unit identifies an area where the number of erroneous determinations is greater than or equal to a predetermined number as an erroneous-determination prone area.

Figure 6:
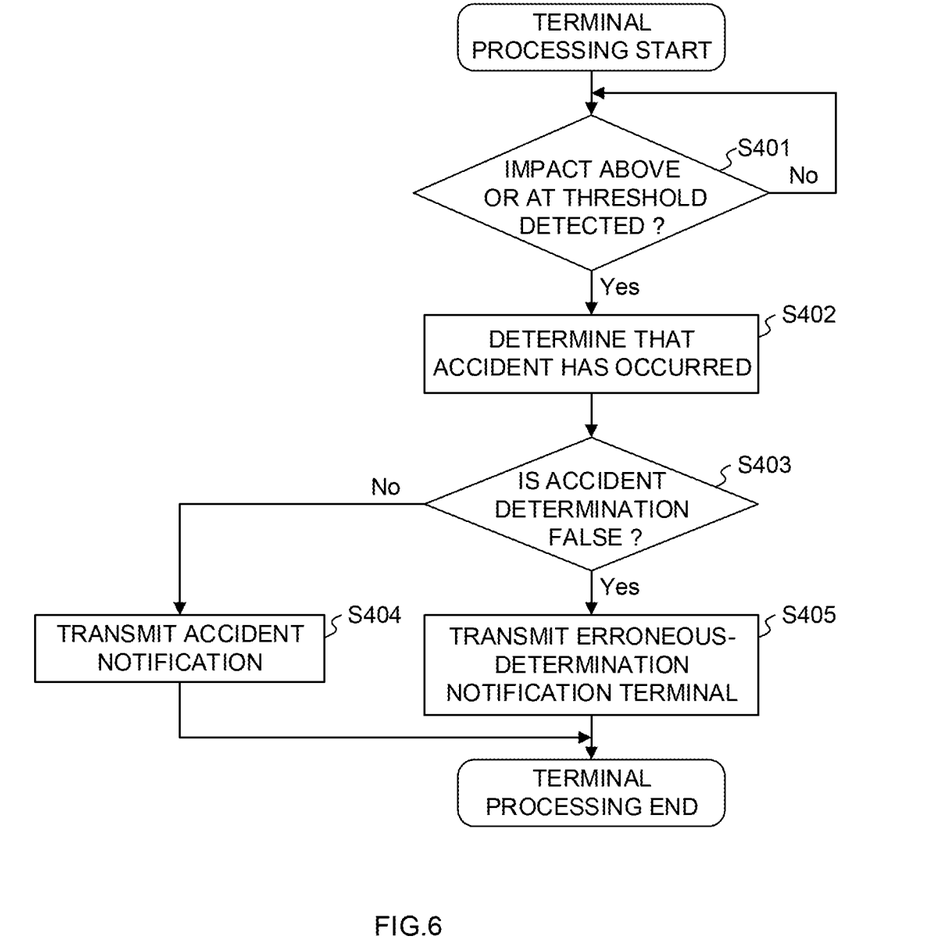
FIG. 6 is a flow chart showing the processing operation of a terminal device.
Figure 7:
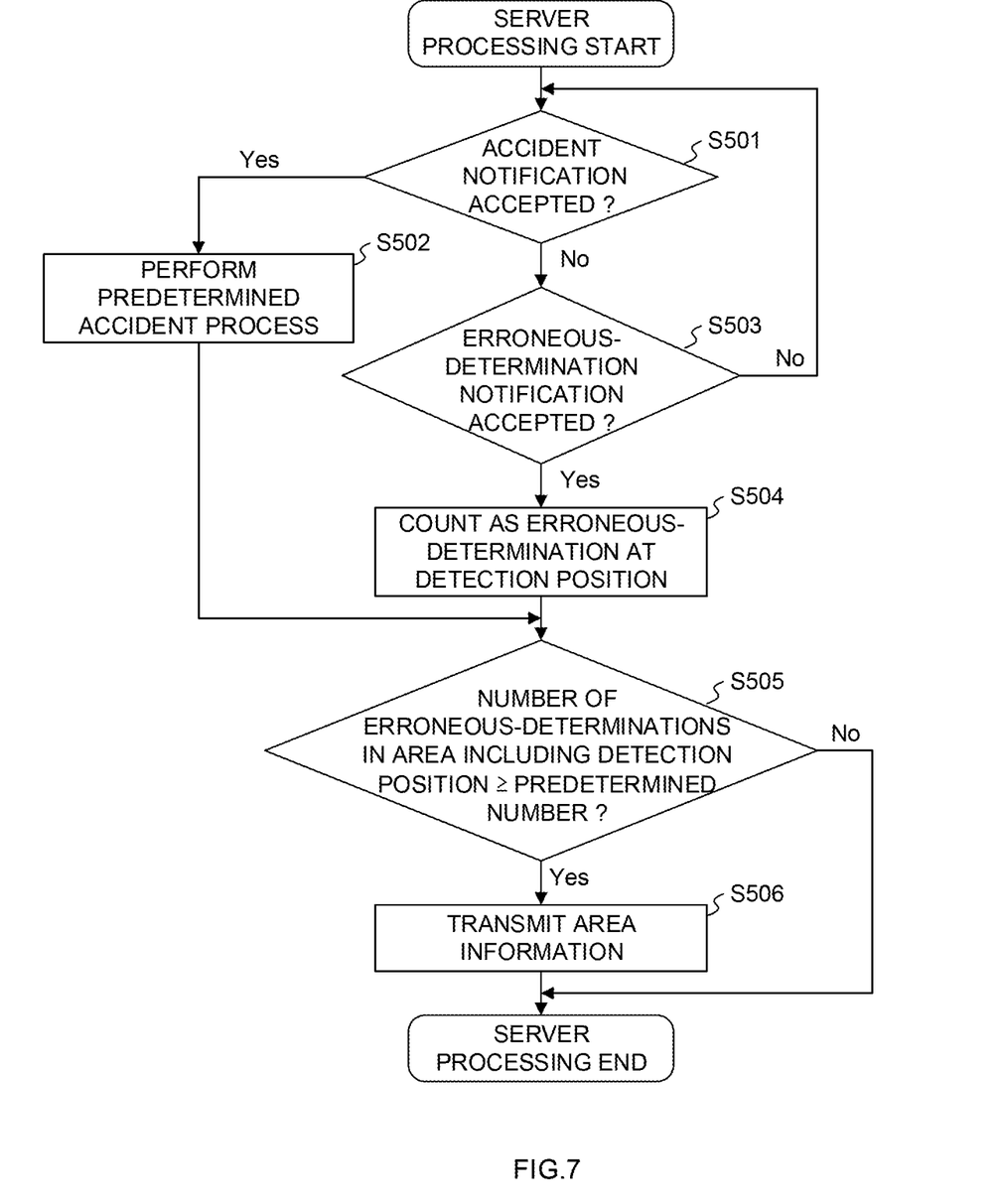
FIG. 7 is a flow chart showing the processing operation of a server.
Figure 8:
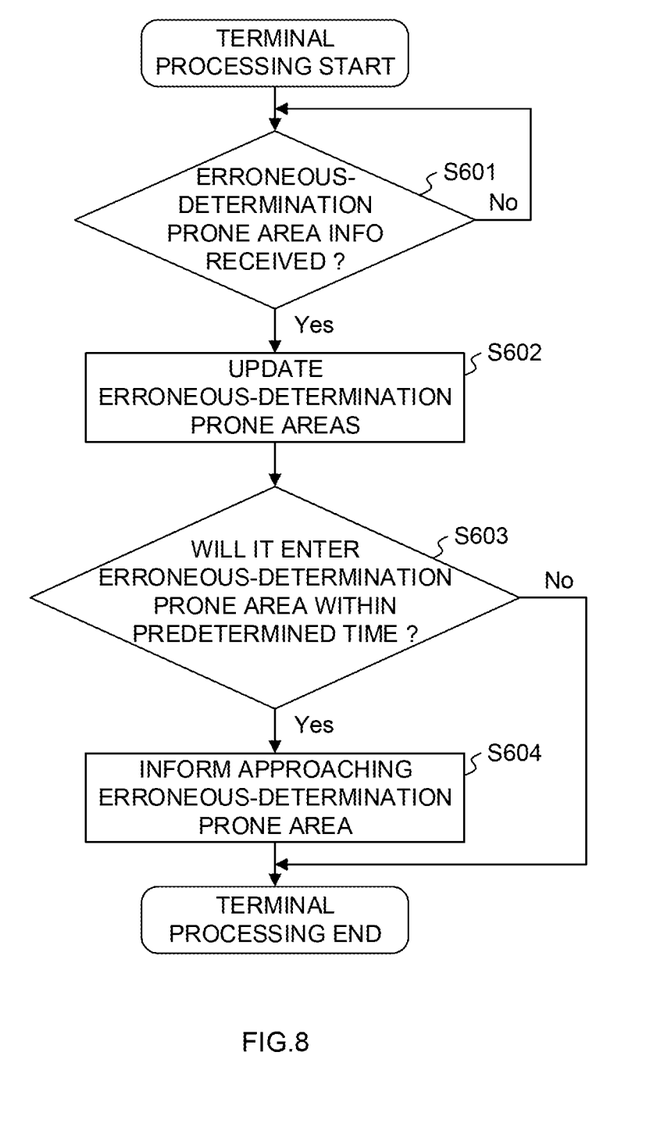
FIG. 8 is a flow chart showing the processing operation of the terminal device.

Next, the operation of accident notification processing executed by the server 20 and the terminal devices 10-1 to 10-n of the present embodiment will be described with reference to the flow charts of FIGS. 6 to 8. Note that description of the threshold calculation processing executed by the threshold calculating unit 25 of the server 20 is omitted.

First, a first processing operation executed by the terminal devices 10-1 to 10-n will be described with reference to the flow chart of FIG. 6. In the description below, one of the terminal devices 10-1 to 10-n is also called simply the terminal device 10.

The impact detecting unit 12 of the terminal device 10 determines whether impact greater than or equal to the threshold has been detected (step S401). If impact greater than or equal to the threshold has been detected, the accident determining unit 14 determines that an accident has occurred (step S402). The notification generating unit 15 generates an accident notification containing position information indicating the position of the vehicle when impact was detected and information about the speed of the vehicle and the impact value of detected impact.

The error determining unit 16 determines whether the accident determination is false (step S403). The error determining unit 16 determines that the accident determination is false if the vehicle has traveled a predetermined distance within a predetermined time or if the driver has operated the withdrawal button. On the other hand, if the vehicle has not traveled a predetermined distance and has stopped and if the withdrawal button has not been operated, then it is determined that the accident determination is not false.

If it is determined that the accident determination is not false, the transmitting and receiving unit 17 transmits the accident notification generated by the notification generating unit 15 to the server 20 (step S404).

On the other hand, if it is determined that the accident determination is false, the notification generating unit 15 generates an erroneous-determination notification containing position information indicating the position of the vehicle when impact was detected, the speed of the vehicle, and the impact value of detected impact. The transmitting and receiving unit 17 transmits the erroneous-determination notification to the server 20 (step S405).

Next, the processing operation of the server 20 will be described with reference to the flow chart of FIG. 7.

The notification accepting unit 22 determines whether an accident notification transmitted from the terminal device 10 has been accepted (that is, whether the transmitting and receiving unit 21 has received an accident notification) (step S501). If determining that an accident notification has been accepted, the notification accepting unit 22 supplies accident-notification acceptance information indicating that the accident notification has been accepted to the accident processing unit 23. The accident processing unit 23 performs a predetermined accident process (step S502).

On the other hand, when determining that an accident notification has not been accepted, the notification accepting unit 22 determines whether an erroneous-determination notification has been accepted (that is, whether the transmitting and receiving unit 21 has received an erroneous-determination notification) (step S503).

When determining that an erroneous-determination notification has been accepted, the erroneous-determination prone area identifying unit 24 counts that erroneous-determination notification as an erroneous determination at the detection position based on information about the detection position contained in the erroneous-determination notification (step S504). The counted erroneous-determination notification is stored in the storage unit 26.

The erroneous-determination prone area identifying unit 24 determines whether the number of erroneous determinations in a predetermined range of area (e.g., an area 50 meters square) including the detection position is greater than or equal to a predetermined number based on information about detection positions, vehicle speeds, and impact values of past erroneous-determination notifications stored in the storage unit 26 (step S505). If the number of erroneous determinations is less than the predetermined number, the server 20 finishes the process.

If the number of erroneous determinations is greater than or equal to the predetermined number, the erroneous-determination prone area identifying unit 24 updates information about erroneous-determination prone areas stored in the storage unit 26. The transmitting and receiving unit 21 transmits the updated information about erroneous-determination prone areas to the terminal devices 10-1 to 10-*n* (step S506).

Next, a second processing operation executed by the terminal devices 10-1 to 10-*n* will be described with reference to the flow chart of FIG. 8.

The transmitting and receiving unit 17 determines whether information about the erroneous-determination prone areas has been received (step S601). When determining that information about the erroneous-determination prone areas has been received, the unit 17 updates information about erroneous-determination prone areas stored in the storage unit 18 (step S602).

The erroneous-determination prone area approach determining unit 19 determines whether the vehicle will enter an erroneous-determination prone area within a predetermined reference time based on information about the erroneous-determination prone areas and current-position information acquired by the position information acquiring unit 13 (step S603).

If determining that the vehicle will not enter an erroneous-determination prone area within the predetermined reference time, the terminal device 10 finishes the process. On the other hand, if it is determined that the vehicle will pass through an erroneous-determination prone area within the predetermined reference time, the output unit 11 informs that the vehicle is approaching an erroneous-determination prone area (step S604). For example, the display section 11A displays a message indicating that the vehicle is approaching an erroneous-determination prone area and to call the driver's attention, and the voice output section 11B outputs a voice message corresponding to this.

As described above, in the accident notifying system of the present embodiment, if a terminal device has detected impact greater than or equal to the threshold, the terminal device determines that an accident has occurred and generates an accident notification. Then the terminal device determines whether the determination that an accident has occurred is false, and, if determining not being false, transmits an accident notification and, if determining being false, transmits an erroneous-determination notification. The server updates information about erroneous-determination prone areas that designates areas where the erroneous determination of an accident notification often happens based on received accident notifications and erroneous-determination notifications and transmits the updated information about erroneous-determination prone areas to the terminal devices.

In the accident notifying system of the present embodiment, the server can identify areas where the withdrawal of an accident notification often happens (that is, erroneous-determination prone areas) based on accident notifications and erroneous-determination notifications transmitted from the terminal devices. Thus, when an accident notification is made, the accident process can be appropriately performed based on information about erroneous-determination prone areas. Further, the reference (e.g., the threshold for impact) with which the terminal device determines an accident happening can be changed based on information about erroneous-determination prone areas, so that erroneous determination of an accident can be prevented.

Further, the terminal device receives information about erroneous-determination prone areas from the server. Thus, the driver who drives a vehicle having the terminal device mounted therein can drive avoiding large impact by lowering the speed or so on when passing through that area, based on information about erroneous-determination prone areas, so that erroneous determination of an accident can be prevented.

Embodiments of the present invention are not limited to what are shown by the above embodiments. For example, in the above embodiments, description has been made taking as an example the case where an impact value (G) is detected based on a change in acceleration to determine whether an accident has occurred. However, the method of determining whether an accident has occurred is not limited to this. For example, it may be determined whether an accident has occurred based on a characteristic of sound of the impact when a vehicle suffers impact.

Further, in the above embodiments, as a means with which the output unit of the terminal device informs that the vehicle is approaching an erroneous-determination prone area, an example is described where the display section displays a message to inform that the vehicle is approaching an erroneous-determination prone area on the screen while the voice output section outputs it as a voice message. However, the output unit need not necessarily perform both screen display and voice output, and a method other than screen display and voice output may be used to inform.

Yet further, the above embodiment 1 describes an example where the erroneous-determination prone area identifying unit of the server 20 calculates the withdrawal rate of accident notifications to identify an erroneous-determination prone area. However, without the erroneous-determination prone area identifying unit calculating the withdrawal rate, an area where the number of withdrawals is large may be identified as an erroneous-determination prone area.

Still further, the above embodiment 2 describes an example where the erroneous-determination prone area identifying unit of the server 20 counts erroneous-determination notifications to identify an area where erroneous determination often happens as an erroneous-determination prone area. However, by calculating the proportion of erroneous-determination notifications to accident notifications, an area where the proportion of erroneous-determination notifications is high may be identified as an erroneous-determination prone area.

A series of processes described in the above embodiments can be executed by computer processing according to a program stored in a recording medium such as a ROM.

The invention claimed is:

1. An information processing device comprising:
a memory configured to store a program; and
a processor configured to execute the program to:
accept from a plurality of terminal devices, which are mounted on a plurality of mobile objects and each of which detects an accident when an impact value, based on a change in acceleration of a respective mobile object, is greater than or equal to a threshold,
a plurality of accident notifications, each including (i) detection information indicating determination that the accident of the respective mobile object has been occurred by detecting impact value greater than or equal to the threshold by a respective terminal device and (ii) site information indicating a site where the impact value has been detected, and
a plurality of withdrawal notifications indicating that the accident determination is false and for withdrawing at least a subset of the plurality of accident notifications;
store, in a storage unit, the accident notifications withdrawn by accepting the withdrawal notifications;
identify an erroneous-determination prone area, which is an area where erroneous-determination about accidents occurs frequently, based on the site information included in the at least a subset of the plurality of accident notifications withdrawn by accepting the plurality of withdrawal notifications; and
transmit information about said erroneous-determination prone area to each one of said plurality of mobile objects,
wherein, based on the information about said erroneous-determination prone area, the each one of said plurality of mobile objects prompt a driver of the each one to notice when the each one approach said erroneous-determination prone area.

2. An information processing device according to claim 1, wherein the processor is configured to execute the program to identify an area, where a number of the at least a subset of the plurality of accident notifications is greater than or equal to a predetermined number, as said erroneous-determination prone area based on said site information included in the withdrawn at least a subset of said accident notifications.

3. An information processing device according to claim 1, wherein the processor is configured to execute the program to:
calculate a proportion of a number of the at least a subset of the plurality of accident notifications withdrawn by the plurality of withdrawal notifications to a number of accepted accident notifications as a withdrawal rate for each area; and
identify an area where said withdrawal rate is greater than or equal to a predetermined value as said erroneous-determination prone area.

4. An information processing device according to claim 1, the plurality of accident notifications includes an information about of the impact value.

5. An information processing device according to claim 4, wherein the processor is configured to execute the program to:
calculate a new threshold for each area instead of said threshold, based on information about impact values and the site information contained in not-withdrawn accident notifications; and
transmit said new threshold to said plurality of mobile object.

6. An information processing device according to claim 5, wherein a computer is configured to execute the program to calculate a new threshold instead of said threshold when a predetermined number or greater of the at least a subset of the plurality of accident notifications withdrawn by accepting the plurality of withdrawal notifications are stored in said storage unit.

7. A terminal device to be mounted in a mobile object, the terminal device comprising:
a memory configured to store a program; and
a processor configured to execute the program to:
detect an impact value that occurred in said mobile object based on a change in acceleration of the mobile object;
transmit an accident notification to an external information processing server, located outside of the mobile object, when the detected impact value is greater than or equal to a threshold, the accident notification containing (i) detection information indicating the determination that an accident of the mobile object has been occurred by detecting impact value greater than or equal to the threshold and (ii) site information indicating a site where the impact value has been detected;
accept a withdrawal operation for withdrawing the accident notification;
transmit a withdrawal notification indicating that the accident determination is false and for withdrawing said accident notification to said external information processing device server in response to the acceptance of the withdrawal operation;
receive information about an erroneous-determination prone area, which is an area where erroneous-determination about accidents occurs frequently identified by said external information processing server based on accident notifications and withdrawal notifications transmitted from a plurality of mobile objects; and
prompt a driver of said mobile object to notice when said mobile object approaches said erroneous-determination prone area.

8. A terminal device according to claim 7, wherein the processor is configured to execute the program to:
transmit said accident notification including an impact value of the impact occurred in the mobile object;
receive a new threshold instead of the threshold to be applied in said erroneous-determination prone area that is calculated by said external information processing server based on the impact values acquired from a plurality of the mobile object; and
take the threshold received by a receiving unit as a threshold for detection in said erroneous-determination prone area.

9. A terminal device according to claim 7, wherein the processor is further configured to execute the program to inform of information about said erroneous-determination prone area when said mobile object approaches said erroneous-determination prone area.

10. An information processing method executed by an information processing device having a processor and a non-transitory computer readable medium, the information processing method comprising:

accepting from a plurality of terminal devices, which are mounted on a plurality of mobile objects and each of which detects an accident when an impact value, based on a change in acceleration of a respective mobile object, being greater than or equal to a threshold, a plurality of accident notifications, each containing (i) detection information indicating determination that an accident of the respective mobile object has been occurred by detecting impact value greater than or equal to the threshold by a respective terminal device and (ii) site information indicating a site where the impact value has been detected;

accepting, from the plurality of terminal devices, a plurality of withdrawal notifications indicating that the accident determination is false to withdraw at least a subset of the plurality of accident notifications;

storing, in a storage unit, the at least a subset of the plurality of accident notifications withdrawn by accepting the plurality of withdrawal notifications;

identifying an erroneous-determination prone area, which is an area where erroneous-determination about accidents occurs frequently, based on the site information included in the at least a subset of the accident notifications withdrawn by accepting the plurality of withdrawal notifications; and transmitting information about said erroneous-determination prone area to each one of said plurality of mobile objects, wherein, based on information about said erroneous-determination prone area, the each one of said plurality of mobile objects prompt a driver of the each one to notice when the each one approach said erroneous-determination prone area.

11. An accident reporting method executed by a terminal device being mounted in a mobile object and having a processor and a non-transitory computer readable medium, the accident reporting method comprising:

detecting an impact value that has occurred in said mobile object based on a change in acceleration of the mobile object;

transmitting an accident notification to an external information processing server, located outside of the mobile object, when the detected impact value is greater than or equal to a threshold, the accident notification containing (i) detection information indicating determination that an accident of the mobile object has been occurred by detecting impact value greater than or equal to the threshold and (ii) site information indicating a site where the impact value has been detected;

accepting a withdrawal operation for withdrawing the accident notification;

transmitting a withdrawal notification indicating that the accident determination is false to withdraw the accident notification in response to the acceptance of the withdrawal operation;

receiving information about an erroneous-determination prone area, which is an area where erroneous-determination about accidents occurs frequently identified by said external information processing server based on accident notifications and withdrawal notifications transmitted from a plurality of mobile objects; and prompting a driver of said mobile object to notice when said mobile object approaches said erroneous-determination prone area.

12. An information processing device according to claim 1, wherein the processor is further configured to execute the program to identify said erroneous-determination prone area, which is an area where erroneous-determination about accidents occurs frequently due to the impact caused by a condition of road surface.

13. A terminal device according to claim 7, wherein the processor is further configured to execute the program to identify said erroneous-determination prone area, which is an area where erroneous-determination about accidents occurs frequently due to the impact caused by a condition of road surface.

14. An information processing method according to claim 10, wherein the erroneous-determination prone area is an area where erroneous-determination about accidents occurs frequently due to the impact caused by a condition of road surface.

15. An accident reporting method according to claim 11, wherein the erroneous-determination prone area is an area where erroneous-determination about accidents occurs frequently due to the impact caused by a condition of road surface.

* * * * *